United States Patent Office 3,066,705
Patented Dec. 4, 1962

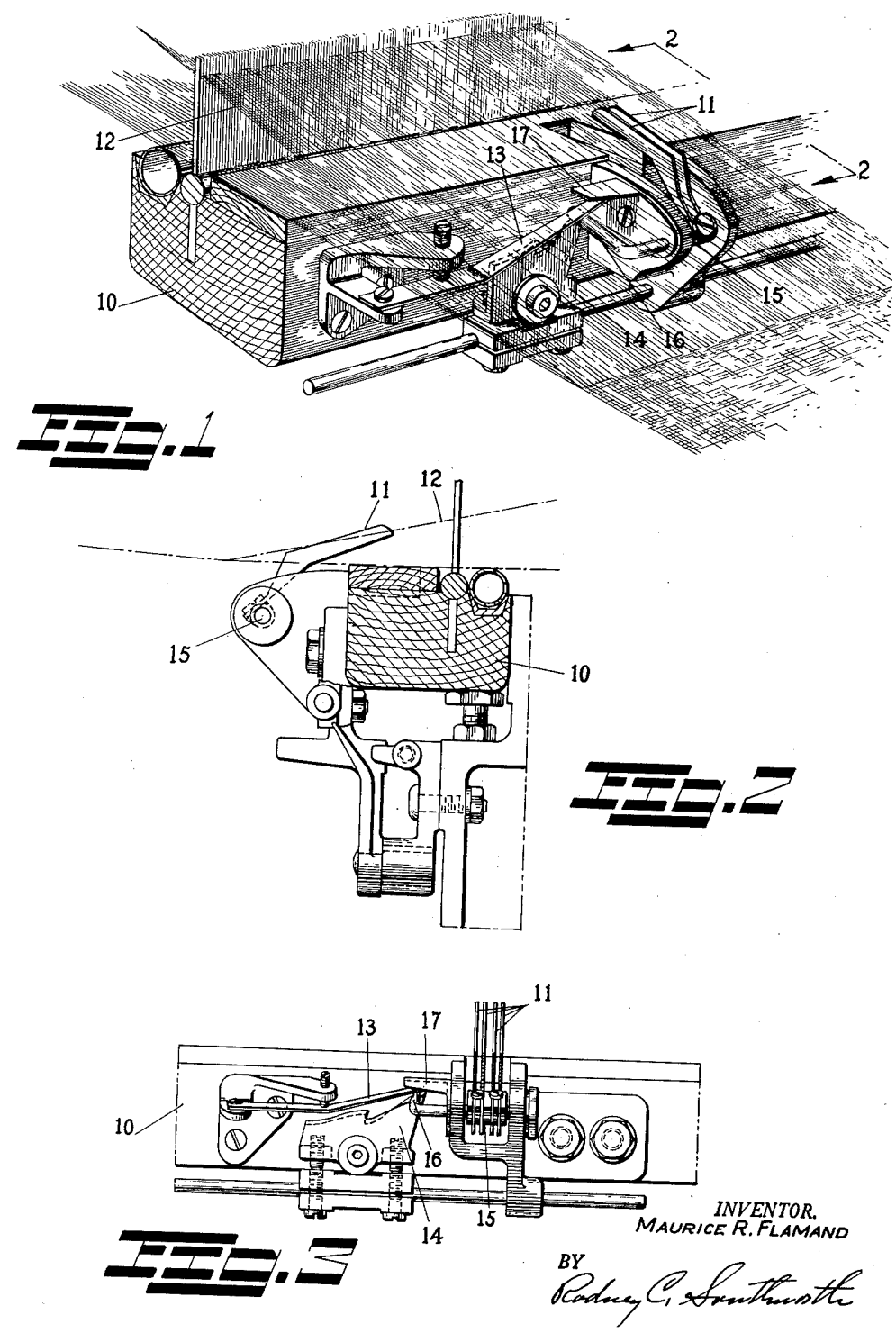

3,066,705
LOOM STOP MOTION
Maurice R. Flamand, Lonsdale, R.I., assignor to Draper Corporation, Hopedale, Mass., a corporation of Maine
Filed Feb. 24, 1960, Ser. No. 10,761
1 Claim. (Cl. 139—374)

This invention pertains to an improvement in the filling motion knock-off as applied to so-called shuttleless looms and more specifically, to improvements in the filling feeling means and the method of operation thereof.

It is the general object of the invention to devise filling feeler tines for a filling stop motion positioned intermediate the shed ends that will insure the entire length of the loose end of said filling to be drawn completely through the shed without damage.

Shuttleless looms which employ reciprocating carriers one of which projects a double length of filling approximately halfway through a shed and the other of which receives that filling and draws the loose end thereof through the remainder of the shed, create certain disadvantages when filling feeler tines of the conventional design are employed. After the transfer of filling by the reciprocating carriers and during the period the receiving carrier is drawing the loose end of the filling through the remainder of the shed, the loose end in many instances, depending upon the type of filling employed, has a tendency to whip around in an uncontrollable manner and very often assumes a position or gets into a condition by which a part of the loose end wraps or entwines itself around the filling feeler tines or one of them causing broken filling, and an incompleted pick which results in an imperfection in the finished fabric.

To overcome and correct this condition, the instant invention employs filling feeler tines featuring a raised upper surface of sufficient height so as to extend through or above the upper warp shed during the period that filling is being inserted into the shed and until such time as the loose end has passed beyond the tines of the stop motion.

The invention will be described in greater detail hereinafter by reference to the accompanying figures of drawing, wherein:

FIG. 1 is a perspective view showing the device according to the invention with filling feeling tines protruding through and above the upper shed;

FIG. 2 is a section taken at line 2—2 in FIG. 1.

FIG. 3 is an elevational view showing the filling fork tines and the cam by which the filling feeler tines are operated.

Now referring to FIGS. 1, 2 and 3, enough of a loom to which the invention has been applied is illustrated to serve as a basis for a description of the method involved. For a more detailed description of a loom of this type reference is hereby made to United States Patents 2,604,124 and 2,641,285.

The loom has among its many parts a lay beam 10 adapted to be swung to and from extreme positions and is held in a position such as that illustrated during a dwell period at which time a double length of filling is inserted into the shed by the right hand filling carrier. At about the same time the filling carrier which receives the inserted filling at transfer enters the shed from the opposite side of the loom and receives that filling inserted by the first carrier. That transfer takes place before the filling reaches the filling feeler tines 11 after which the carrier draws it through the remaining portion of shed 12 to complete the pick.

When the inserted filling is received by the second filling carrier, the loose end before being drawn under the filling feeler tines to complete the pick, in many instances, depending on type filling, has a tendency to whip around in an uncontrollable manner. According to the prior art filling feeler tines have been relatively narrow in their vertical dimension and when raised preparatory to having filling drawn beneath them have extended across the shed space leaving a sizeable opening above the tine and below the upper warp sheet as well as the bottom. As the pick is drawn rapidly through the shed its uncontrolled end whips around and has in instances become wrapped about one or more of those tines in such a manner as to cause the end to be broken. This, of course, resulted in a short pick with a broken end woven into the fabric, something not to be tolerated since such a fault makes the fabric decidedly second quality. According to the instant invention, tines 11 are provided at least the upper portions of which are of sufficient height so as to extend through or above the upper shed 12. This makes it impossible for the loose end of filling to become entangled with said filling fork tines 11.

In operation the presence or absence of a filling thread is detected by the filling fork tines 11 which move upwardly between warp threads in the shed to a position above the filling as it is inserted and drawn through the shed. The tines then move downwardly under influence of spring 13 and as permitted by the action of the cam 14. The tines are fixed to a pivot 15 upon which they swing and from which a laterally directed arm 16 extends to be governed by the spring 13 and cam 14. An overthrow stop 17 prevents excessive travel of the tines in the upward direction. As can be seen in FIGS. 1 and 2, the tines or at least, the extended or raised upper portions thereof project to some extent through the top warp sheet 12 thus forming a barrier above which a whipping filling end may not pass. No wrapping or entangling of the end is then possible.

As a matter of uniformity all filling feeler tines 11 illustrated are the same; however, to accomplish the desired purpose of this invention, the only filling feeler tine that need be of the required shape as heretofore described is that tine which is positioned toward the side of loom at which filling is inserted.

These tines are more in the nature of a plate rather than being thin strip-like elements as has been the case heretofore. In this disclosure and claims the term "upper plate-like portions" is used to describe or define the novel elements and by that term tines of more or less the form illustrated are meant. However, the dimensions may vary considerably as long as they do not permit the filling to whip around them.

Since filling cannot wrap around a tine and become broken to leave a short end at the tine to be woven in, the tines are not held from dropping to stop the loom this being something which did not occur when ordinary tines were employed. In other words, the prior art was open to two serious faults, first, the tines contributed to filling breakage and then, the nature and effect of the broken end was such as to prevent the loom from stopping at the broken pick.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claim.

I claim:

For a loom of the type in which filling in the form of cut lengths is inserted in a warp shed, filling stop motion members positioned intermediate the shed ends and including filling feeling tines movable upwardly between warp threads in the shed to a position above the filling as it is inserted and then movable downwardly to a position to be retained by the filling if present and to a lower portion to stop the loom upon detecting a filling fault, a pivoting means beneath the warp shed to which said tines are fixed, other means including a cam and spring for controlling said tines, at least the upper portions of said tines being plate-like for preventing a cut end of filling from whipping around a tine, said portions being of sufficient height to extend through and above the upper warp shed during filling insertion and at least until the cut end thereof has passed the tines of the stop motion.

References Cited in the file of this patent

UNITED STATES PATENTS

| | | |
|---|---|---|
| 719,647 | Budzyna et al. | Feb. 3, 1903 |
| 2,647,545 | Clark | Aug. 4, 1953 |

FOREIGN PATENTS

| | | |
|---|---|---|
| 638,068 | Germany | Nov. 9, 1936 |